July 28, 1942. W. L. GROENE 2,291,035
MULTIPLE SPINDLE INDEXING CRANK PIN LATHE
Filed July 6, 1940 9 Sheets-Sheet 5
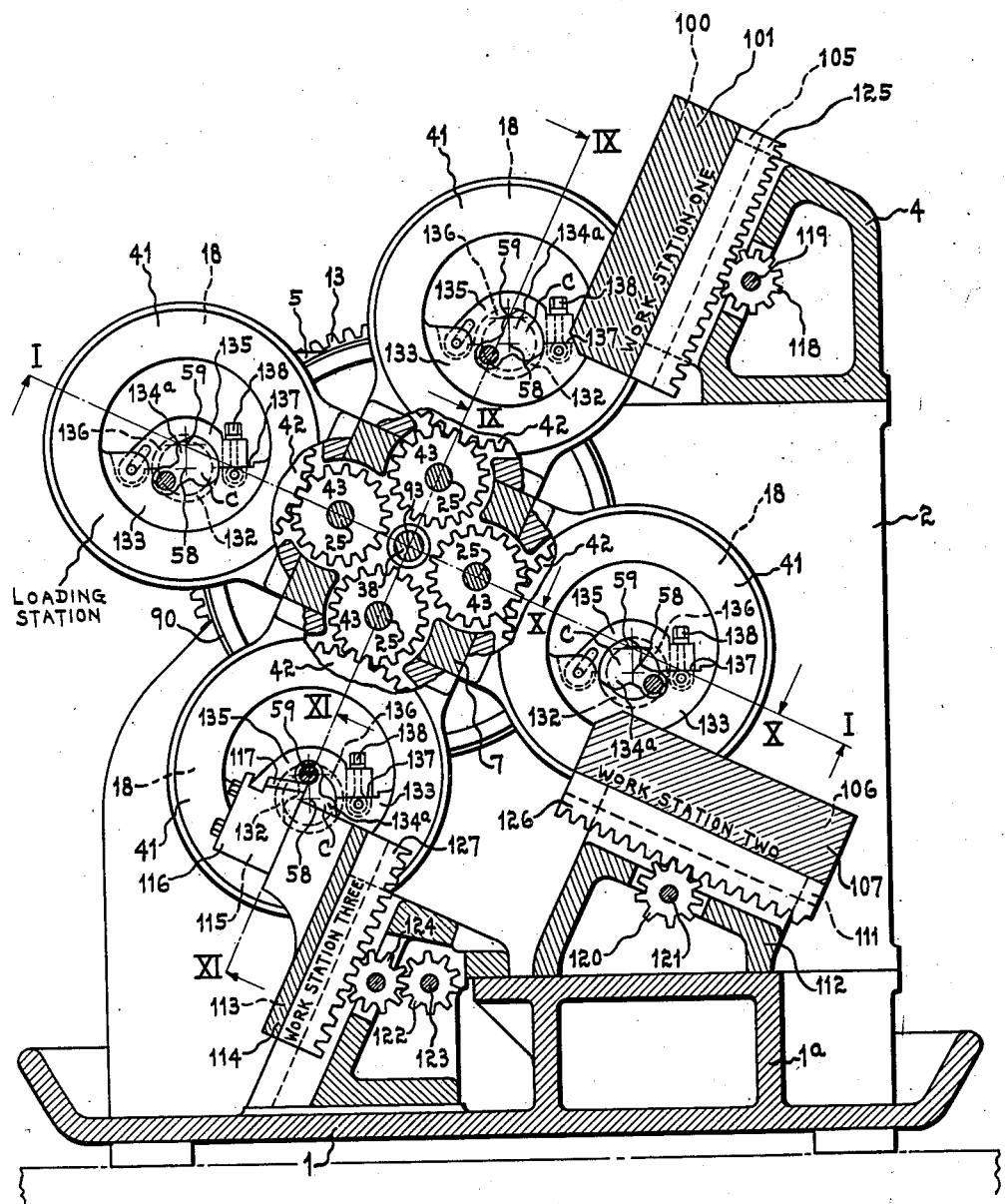
FIG. V
INVENTOR.
BY Willard L. Groene

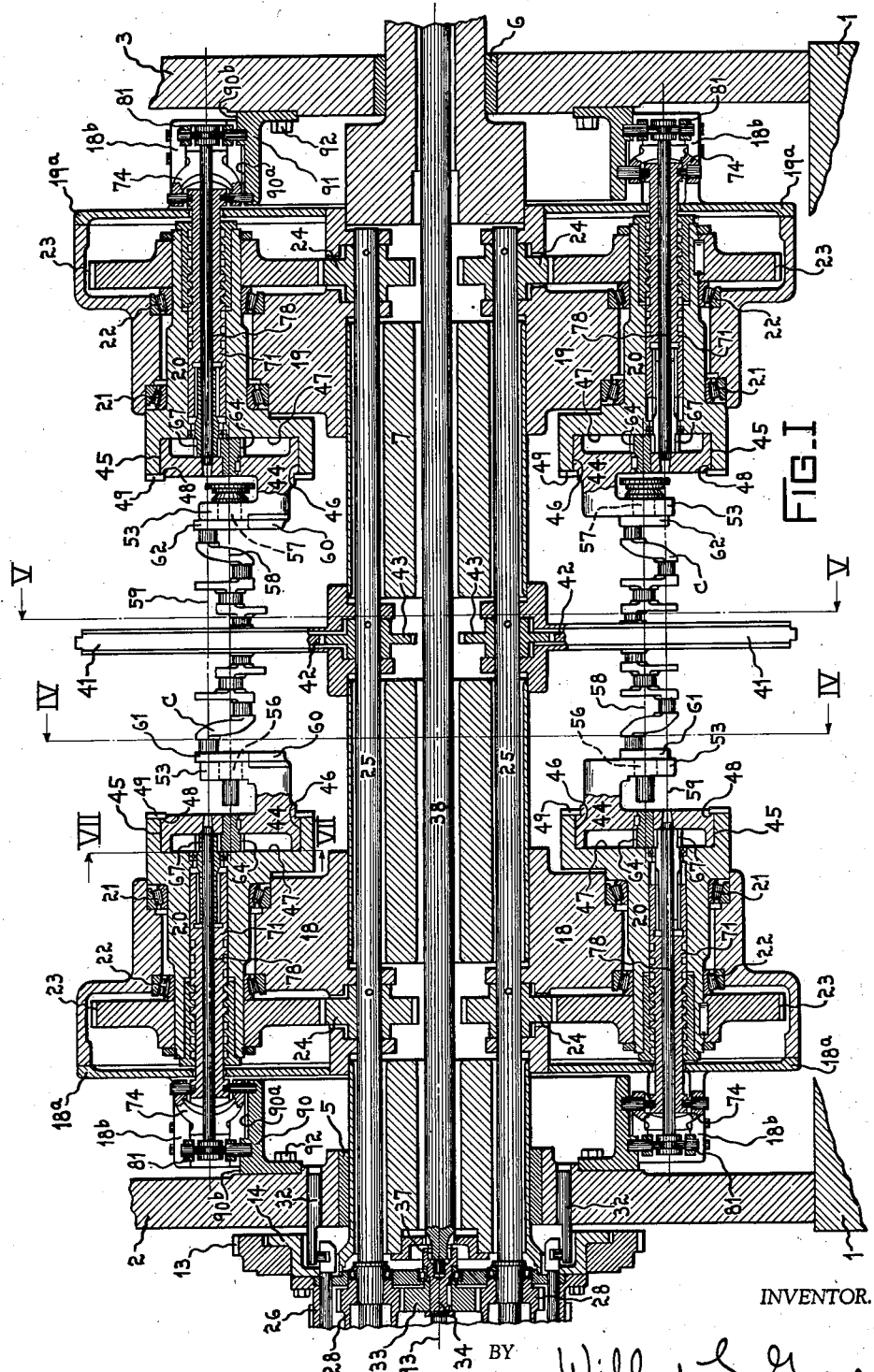

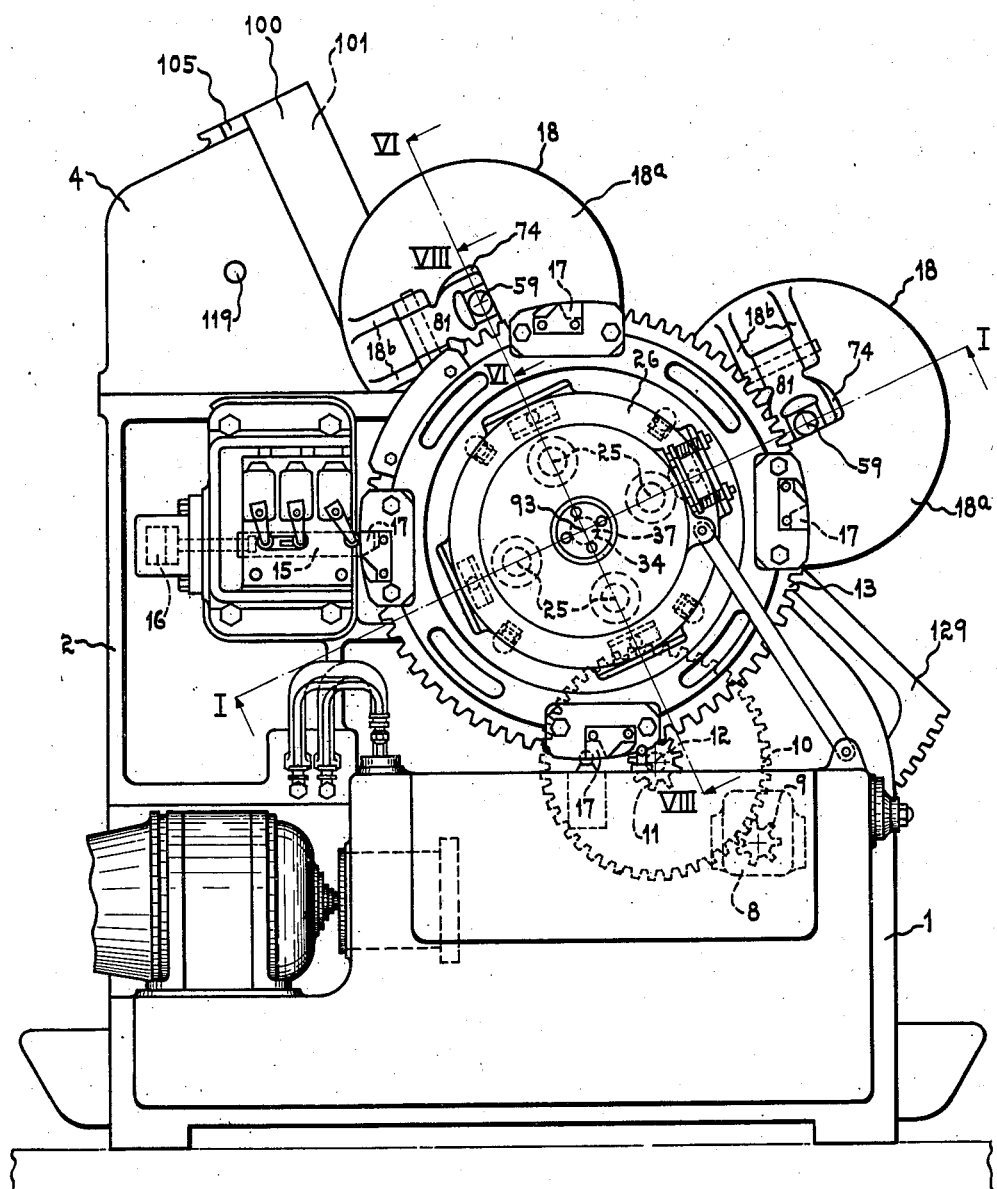
FIG. II

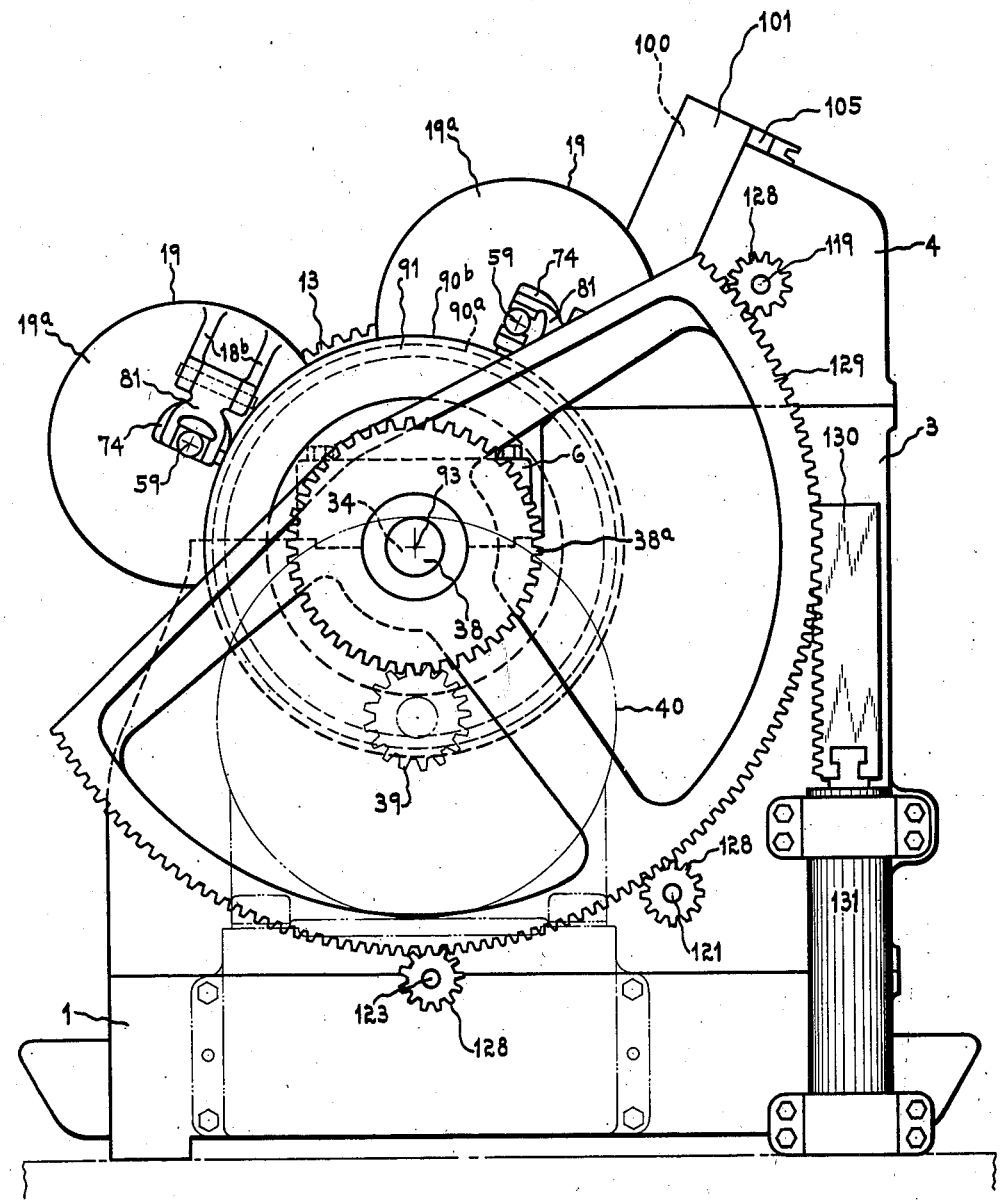
FIG. III

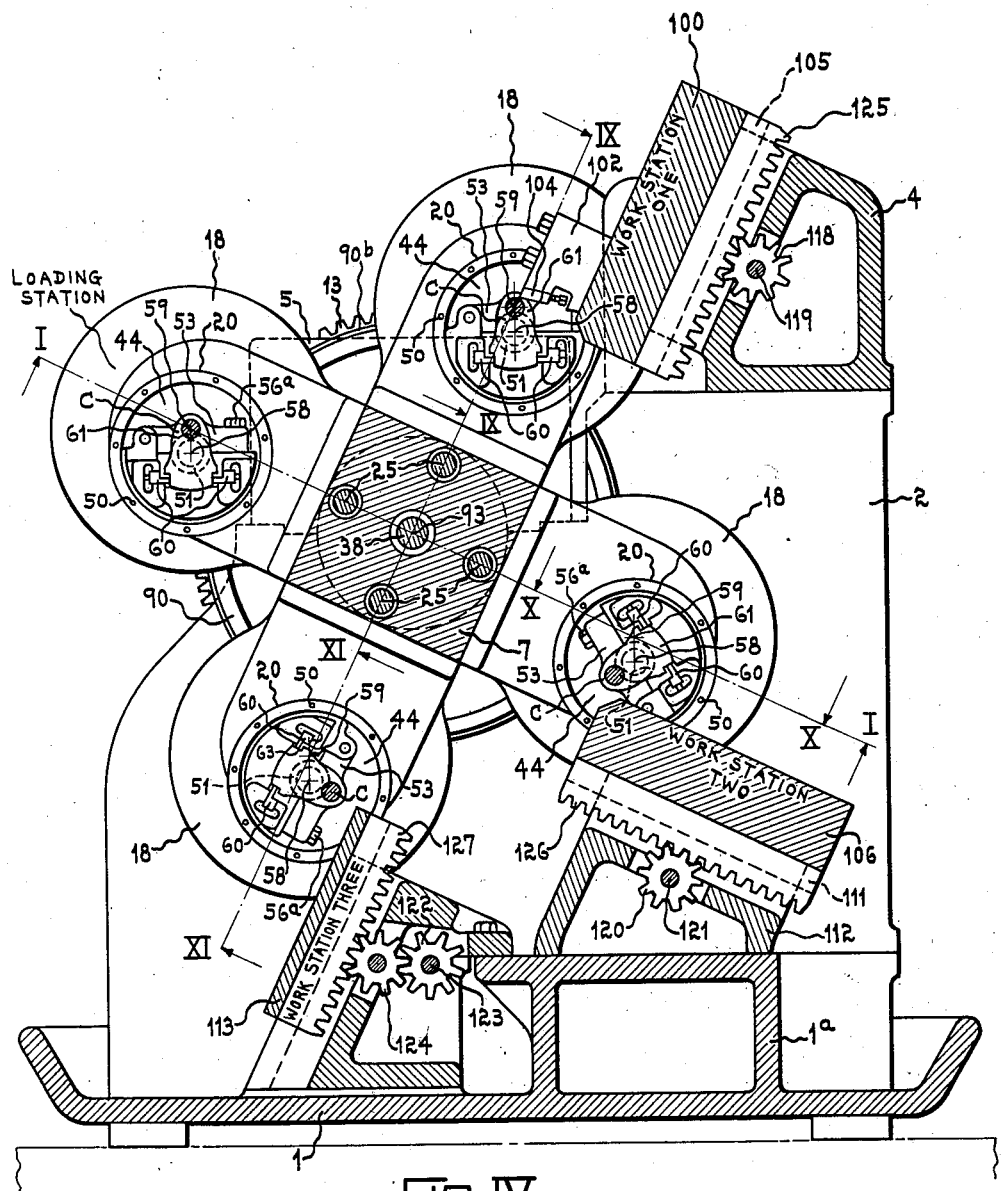
FIG. IV

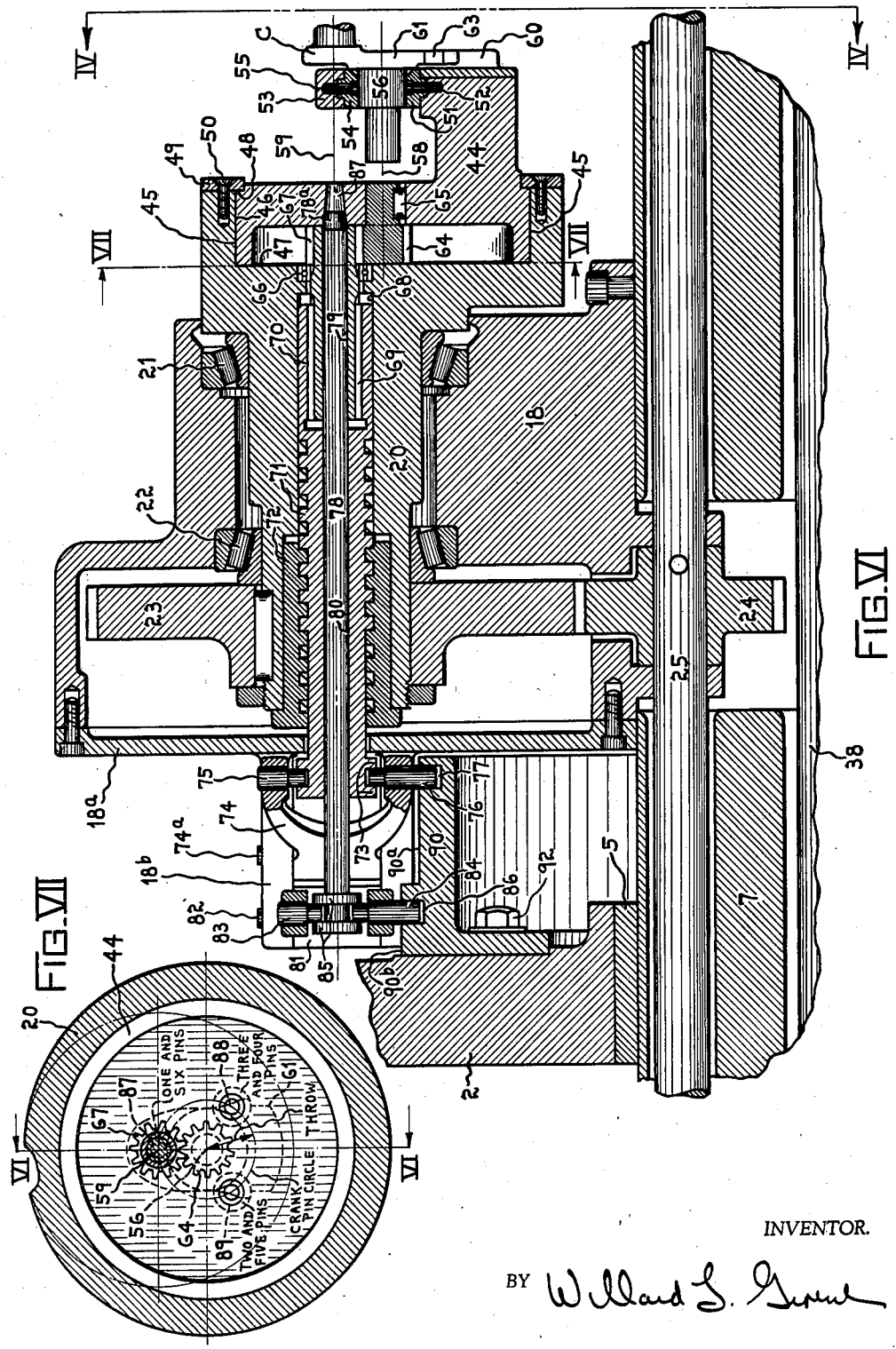

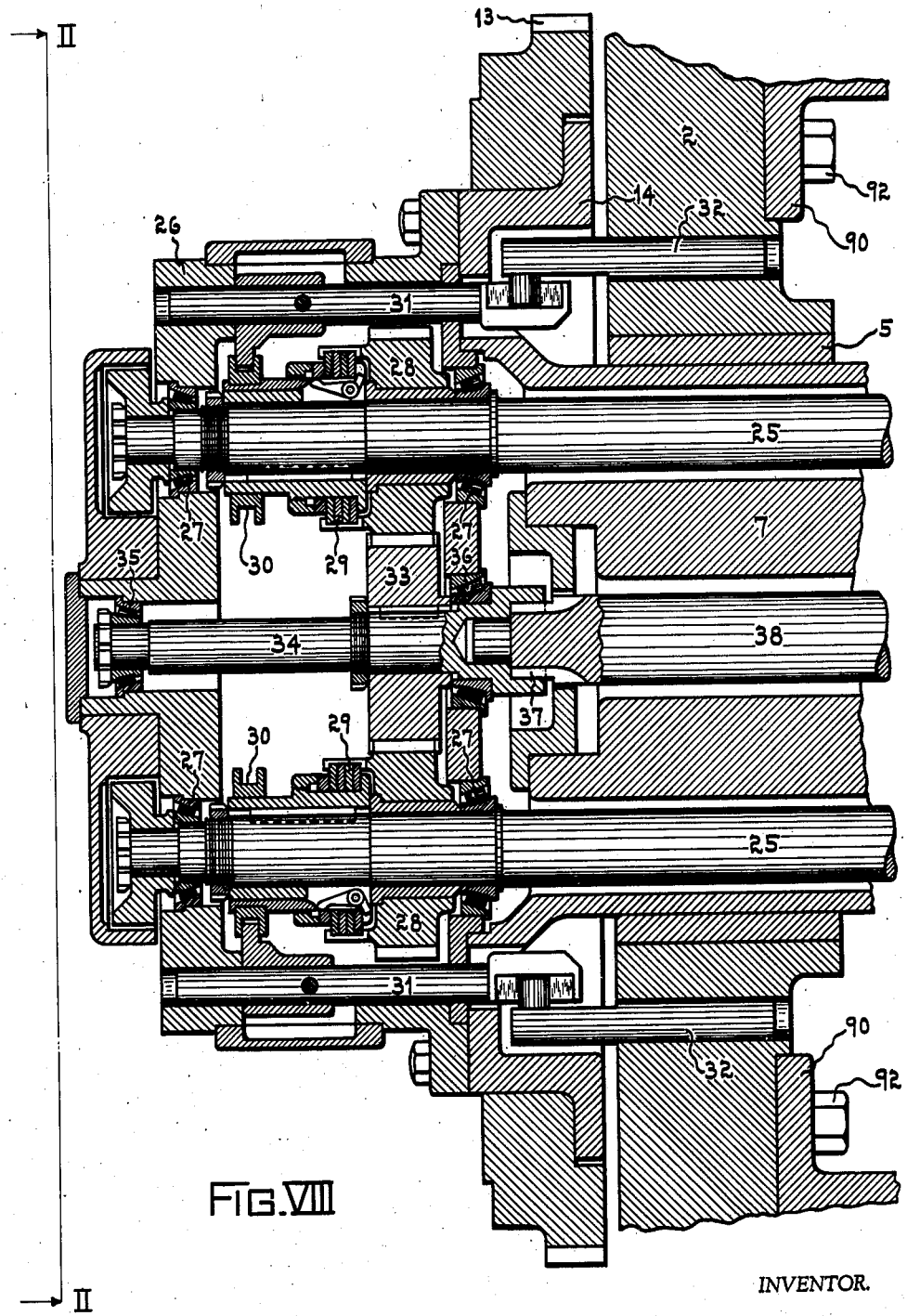
July 28, 1942. W. L. GROENE 2,291,035
MULTIPLE SPINDLE INDEXING CRANK PIN LATHE
Filed July 6, 1940 9 Sheets-Sheet 7
FIG. VIII
INVENTOR.
BY Willard L. Groene

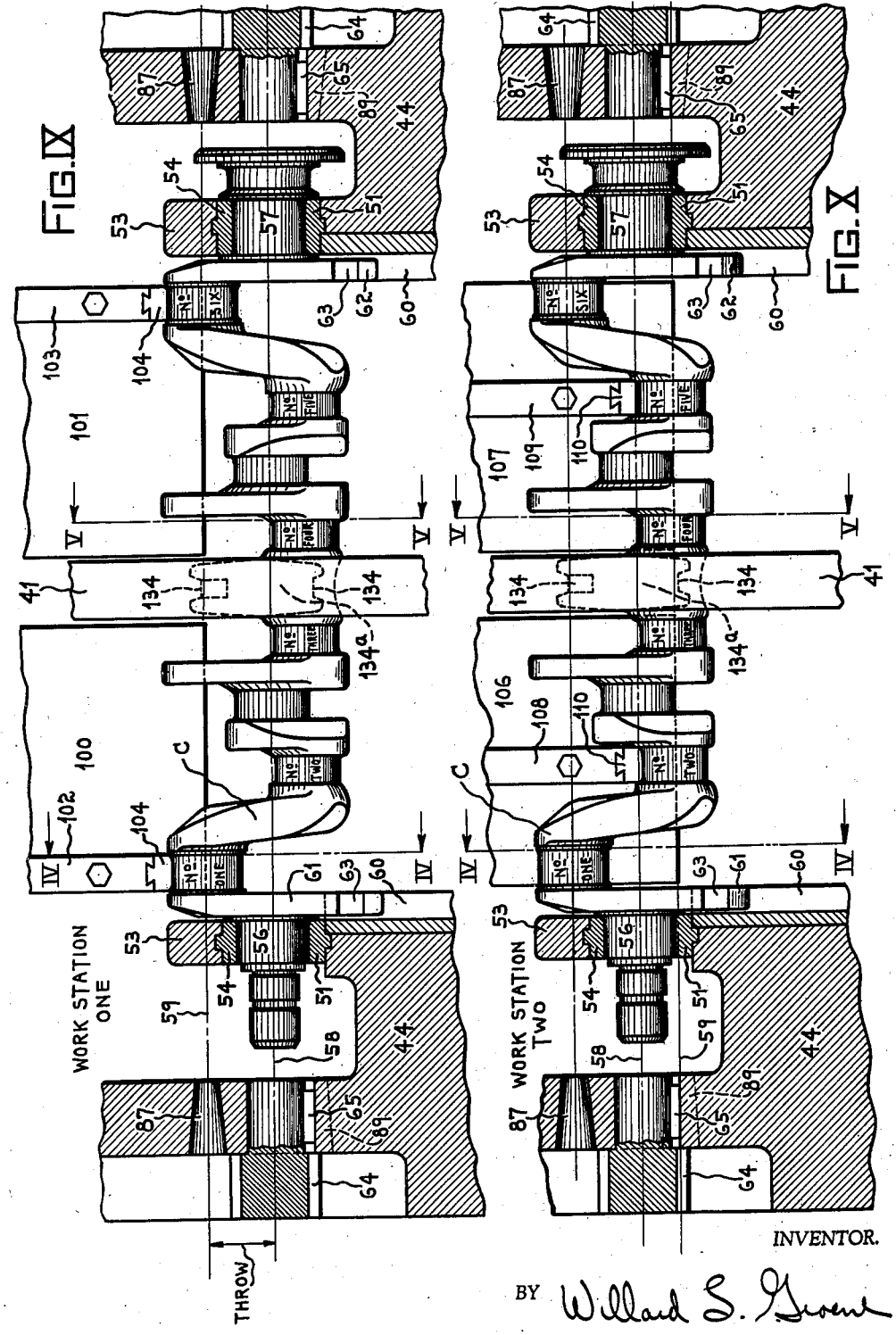

July 28, 1942.  W. L. GROENE  2,291,035
MULTIPLE SPINDLE INDEXING CRANK PIN LATHE
Filed July 6, 1940  9 Sheets-Sheet 9
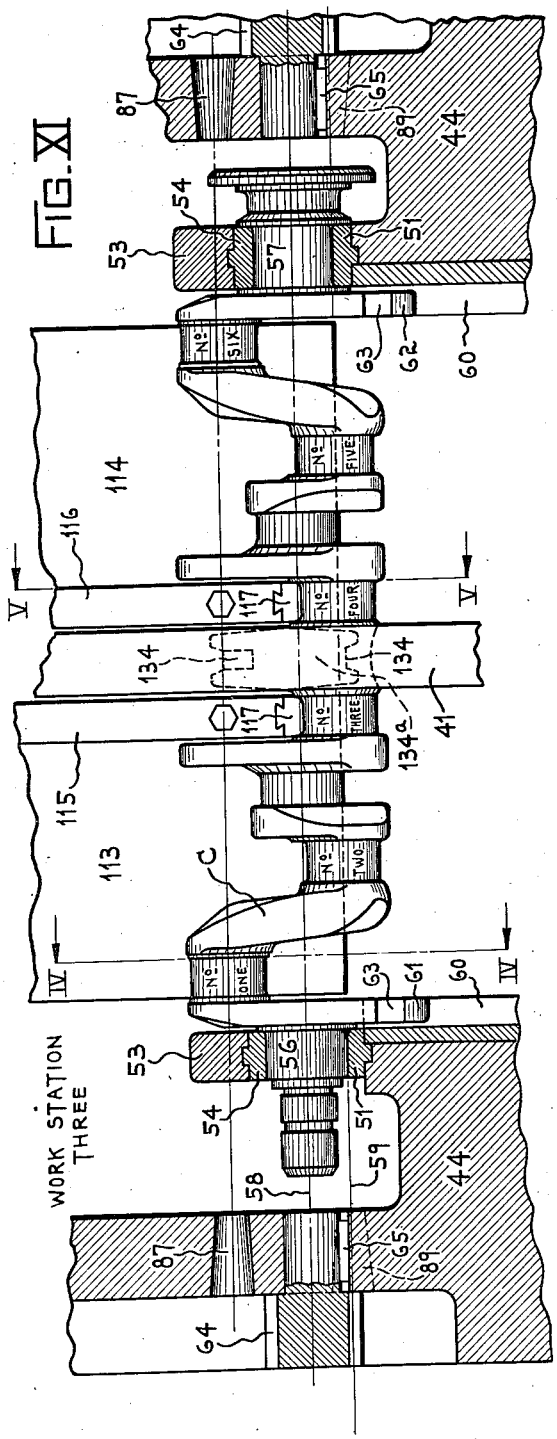
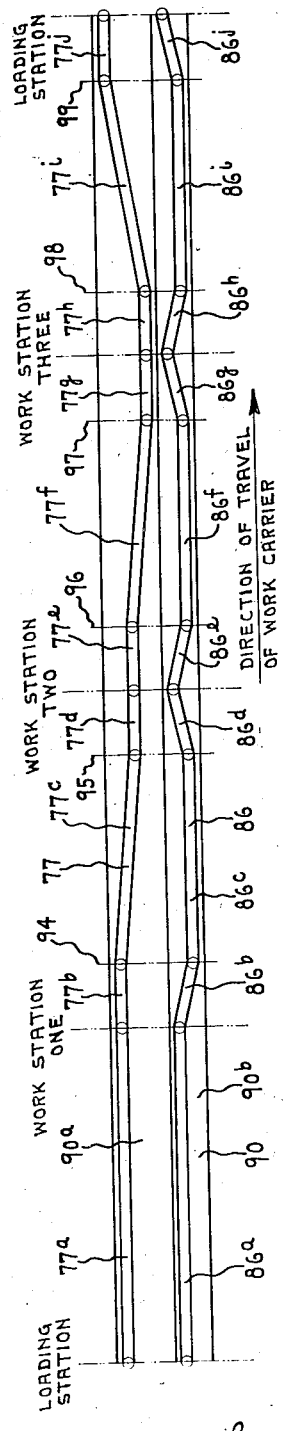
INVENTOR.
BY Willard L. Groene Patented July 28, 1942

2,291,035

UNITED STATES PATENT OFFICE 2,291,035

MULTIPLE SPINDLE INDEXING CRANKPIN LATHE

Willard L. Groene, Cincinnati, Ohio, assignor to The R. K. Le Blond Machine Tool Company, Cincinnati, Ohio, a corporation of Delaware Application July 6, 1940, Serial No. 344,243

24 Claims. (Cl. 82—9)

This invention pertains to multiple spindle indexing lathes, and is particularly related to such types of lathes adapted for turning the crank pins of multi-throw internal combustion engine crankshafts.

Heretofore, in turning the crank pins of crankshafts, there have been two chief methods by which the pins were turned. One of the methods, and the older method, was that of chucking the crankshaft in a lathe so that the crank pins lying on the same axis and in the same indexed direction were presented on the work spindle axis of the lathe, the remainder of the crankshaft being rotated eccentrically of these pins being turned by suitable offset pot chucks on the work spindles of such lathes. Cutting tools were then applied by directly feeding them radially the axis of rotation of the lathe to turn the respective pin bearings presented on the axis of rotation of the lathe. Such an operation required either the continuous changing of the cutting tools to different positions and the re-indexing of the crankshaft for each set of pins presented to the work axis or otherwise would require a series of different machines and the transferring of the work from one lathe to the next until the complete set of pins were finally machined. This method failed because of the invariable inaccuracies which cropped in every time the work was re-chucked and the tooling reset or in moving the work from machine to machine. The difficulties of continuously re-chucking the crankshaft and the spring resulting in the crankshaft during the transfer from one machine to the other, as caused by the cutting action of the tools on the work, precluded any practical possibility of obtaining the proper and necessary high degree of accuracy for these crankshafts as manufactured today and also involved large amounts of productive time so that the operation of turning the crank pin by this older method was found wholly impractical and was subsequently later displaced by the method of simultaneous turning of all of the crank pin bearings at one time in what is known as an orbital lathe, for example, as illustrated in Reissue Patent 18,662.

This latter method of turning all of the crank pins simultaneously by orbital turning was found sufficiently productive and rapid to make it a worth while procedure and has been largely adapted to date. However, as progress has been made rapidly in the performance of these multi-throw internal combustion engines, which have more recently been applied to aircraft work in which relatively high speeds and relatively light and fragile crankshafts are involved, it became evident that the method of cutting all of the bearings at one time on such types of crankshafts, would not provide sufficiently accurate work with sufficient rapidity to make the multiple pin turning by orbital lathe feasible. There was also the difficulty because of the high degree of accuracy also required for such types of fragile crankshafts, that the orbital motion of the tool carrier unit was not precisely uniform due to the impracticability of fitting all of the bearings of the various orbitally moving tool carriers closely enough on the master crankshafts of such lathes, and also because of the back lash inherent in the interconnecting gearing between the master crankshafts and the work spindles. The result is therefore, that in attempting to finish such crankshafts of the present day modern high speed internal combustion engine, particularly those used for aircraft work, resulted in the pin bearings being turned eccentric or out of round so that the finishing operation of polishing and grinding could not take care of these difficulties without excessive grinding time being consumed and therefore making the practicability of high production of such types of work wholly impossible.

It therefore became apparent that some type of lathe was needed which would first of all perform the machining operatoins on the crank pins of such crankshafts at very rapid rates without distorting, twisting, or bending the shaft preventing the proper finished accuracy in the work and also a lathe in which the orbital movement of the tool carriers and tools was wholly eliminated so that the difficulties of eccentric pins and out of round of the finished work diameters on the crank pins was eliminated.

It was with this problem in mind that the present machine incorporating this invention, was conceived. One object of this invention is to provide a multiple spindle indexing crank pin lathe in which all of the crank pins of a plurality of crankshafts are turned simultaneously at a series of different work stations in such a way that at each work station pairs of similarly indexed and aligned crank pins are turned at a time, and as the various crankshafts proceed from one work station to another, they are automatically indexed to bring other pairs of similarly positioned and axially aligned crank pins into working position for the cutting tools.

Another object of this invention is to provide a multiple spindle indexing crank pin lathe, means for feeding a series of cutting tools at all of the work stations for machining respective pairs of crank pins at each of the work stations without resorting to any orbital motion for the cutting tool carrying means.

It is a further object of this invention to provide a multiple spindle lathe having a series of work spindles carried on an indexing work carrier, each of these work spindles having means for chucking and supporting a crankshaft in such a way that its various crank pins may be presented to the axis of rotation of the work spindles as they are moved to respective work stations, at which cutting tools are arranged on the frame of the machine to be fed radially the axis of rotation of each of the work spindles to perform cutting operations on the crank pins.

And still another object of this invention is to provide a means for chucking a crankshaft with its various sets of crank pins lying in a circle passing through the axis of rotation of the work spindle and to provide means for automatically indexing various sets of crank pins on to the axis of rotation of the work spindle as said work spindles are presented to each of a series of work stations at which various turning operations are undertaken on different sets of crank pins to be machined.

It is also an object of this invention to provide a work spindle in which may be chucked a crankshaft eccentrically of the axis of rotation with the line bearing axis eccentric from that of the axis of rotation of the work spindle and so that its crank pins lie in a circle passing through the axis of rotation of the work spindle and to provide means for automatically indexing the work holding members on the work spindles to bring successive sets of pins on the axis of rotation of the work spindle, and also to provide rotary steady rest means, rotating in synchronous relationship with the work spindles, for supporting the crank shaft intermediate the chucking devices and which are so arranged that said crankshaft may be indexed to bring its various crank pins in proper relationship with the work spindles for turning the respective sets of crank pins.

A still further object of this invention is to provide a multiple spindle indexing crankshaft lathe having an indexing work carrier upon which are mounted a series of work spindles to provide a series of work stations to which these work spindles may be indexed, and to have tool feeding devices mounted on the frame of said lathe adapted to be fed radially of the axis of rotation of the work spindles when moved to indexed position at these work stations. It is then the object to have chucking devices adapted to chuck a crankshaft with its line bearing axis so offset that its crank pins may be brought with their axes on the axis of rotation of the work spindles, and to further provide means for automatically indexing these respective crank pins to the axis of rotation of the work spindles at each of the respective work stations so that various pins may be turned at each of said work stations until the entire series of crank pins of said crankshaft are completely machined when brought back to the loading station.

And it is also an object to provide in conjunction with the arrangement above set forth, a rotary steady rest device which is driven in synchronism with the work spindles and pot chuck devices which is provided with an eccentric journal bearing for an intermediate portion of the crankshaft provided with a premachined line bearing or provided with a peripheral locating area on a web, so that the crankshaft may be automatically indexed by the pot chuck devices while at all times maintaining its proper indexed relationship with the center drive steady rest.

Further features and advantages of this invention will appear from the detailed description of the drawings in which:

Figure I is a diagrammatic longitudinal cross section through a four spindle indexing crank pin lathe shown on the line I—I of Figures II, IV, and V, particularly showing the construction of the indexing work carrier or drum and the drive mechanism for the work spindles and center drive steady rests.

Figure II is a left hand end elevation of the lathe of Figure I, particularly showing the hydraulic indexing mechanism and the braking mechanism for arresting rotation of the work spindles when brought to the loading station, as shown on the line II—II of Figure VIII.

Figure III is a right hand end elevation of the machine particularly showing the hydraulic feed mechanism for actuating the tool slides at the various work stations.

Figure IV is a vertical transverse section through the machine on the line IV—IV of Figures I, VI, IX, X, and XI, particularly showing the indexing pot chucks carried on the work spindles mounted in headstocks on the work carrier of the machine.

Figure V is a vertical transverse section through the lathe on the line V—V, of Figures I, IX, X, and XI, particularly showing the center drive steady rests which are driven in synchronism with the work spindles carrying and indexing pot chucks shown in Figure IV.

Figure VI is an enlarged section on the line VI—VI of Figures II, and VII, particularly showing the cam actuated mechanism for operating the indexing plunger and rotating the pot chuck to the various indexed positions on the work spindle to bring the crank pin on the axis of rotation of the work spindles as they come to each of the various work stations and loading station.

Figure VII is a section through the indexing pot chuck on the work spindle shown by the line VII—VII in Figures I and VI, particularly showing the gears for effecting rotation of the pot chuck to indexed position and the tapered holes which are engaged by the indexing plunger for each work spindle.

Figure VIII is an enlarged fragmentary section of the work spindle driving mechanism shown on the line VIII—VIII of Figure II.

Figure IX is a fragmentary enlarged diagrammatic view substantially on the line IX—IX of Figures IV and V showing the cutting tools operating on number one and number six pins of a six-throw internal combustion engine crankshaft at work station one.

Figure X is a diagrammatic view on the line X—X of Figures IV and V, showing the tools which operate on the number two and number five crank pins of this six-throw crankshaft at work station two.

Figure XI is a diagrammatic view showing the tools operating on the number three and number four crank pins at the work station three.

Figure XII is a diagrammatic extended view of the periphery of one of the actuating ring cams for operating the indexing plunger and indexing mechanism for rotating the indexing pot chucks of each of the work spindles as they are indexed by the work carrier to the various work stations and loading station during the operating cycle of the machine.

For illustrative purposes, this unique machine is shown applied to turning the six crank pin bearings of a conventional fixed throw four line bearing crankshaft. It is to be understood that in this machine, one work station is required for each crank pin or pins lying in one particular indexed position, so that in this instance, three work stations are required, that is, one for each of the respective pair of pins lying on the same axis in the same indexed position around the main bearing axis of the crankshaft. In other words, in turning a conventional four-throw crankshaft, two work stations are required and in turning a conventional eight crankshaft, a total of four work stations would be required. Again, if a two-throw crankshaft were to be machined, in which each of its crank pins lie in a different indexed position, again two work stations would be required. And also, of course, in instances where a three-throw shaft were to be turned in which each of the three crank pins lie in different indexed positions around its main axis, three work stations would be required.

Indexing work spindle carrier

The machine comprises a base 1 upon which are mounted the upright housings 2 and 3, which are connected together by the longitudinally extending frame 4 suitably bolted to these upright supports 2 and 3. Journaled in the bearings 5 and 6 in the respective supports 2 and 3, is the work carrier or indexing drum 7, which is arranged to be rotated to various indexed stages by means of the hydraulic indexing motor 8, Figure II, having a pinion 9 driving the gear 10 of the compound gear 10—11 journaled on the stud 12. The pinion 11 of the compound gear 10—11 drives the indexing gear 13 appropriately fixed on the flange portion 14 of the indexing drum 7, as best shown in Figure VIII. A suitable indexing plunger 15, operated by the hydraulic cylinder 16 is arranged to operate in the indexing notches 17 carried in the indexing gear 13. This entire hydraulic indexing apparatus functions so as to index the drum 7 to the various work stations one, two, and three and the loading station, shown best in Figures IV and V, in a manner substantially as fully and completely described in Patent Number 2,138,522 and it will suffice to state that this apparatus is capable of effecting the accurate indexing of the drum 7 to the various stations. On the indexing drum 7, are mounted apparatus constituting the four work spindles, in this illustrative showing, comprising headstocks 18 and 19 securely mounted on the drum 7. Each of these headstocks as best shown in Figure VI, comprise a work spindle 20 journaled on appropriate antifriction bearings 21 and 22 carried in the headstocks 18 and 19. Mounted on these spindles 20 are the driving gears 23 which are driven by the pinions 24 fixed on the driveshafts 25 of which there is one for each of the work spindle assemblies. In this way, each of the spindles 20 in the headstocks 18 and 19 for each work spindle are rotated in the exact and positive synchronism at all times by means of the drive shaft 25.

Work spindle drive mechanism

Noting particularly Figure VIII, the drive shafts 25 project to the left into the driving clutch housing 26, where their outer ends are carried in suitable bearings 27. On these shafts 25 are journaled the driving gears 28 which may be connected or disconnected to the drive shafts 25 through suitable clutch mechanism 29 operated by the actuating mechanism 30 under control of the actuating rods 31 and the actuating dogs 32 fixed in the housing upright support 2, in a manner fully disclosed in the Patent #2,138,522, referred to above. The gears 28 are arranged to all be in mesh with the central driving pinion 33 fixed on the central drive shaft 34 which is journaled on the bearings 35 and 36 in the housing 26. This shaft 34 is driven through a suitable splined connection 37 by the motor drive shaft 38 which extends to the right of the machine, projects outwardly, and carries on its end a gear 38a, which in turn is driven by the motor pinion 39 of the main drive spindle motor 40, as best shown in Figure III.

In this way, all of the spindles 20 may be driven from the main drive motor 40 and may be stopped from rotation when entering the loading station and again re-started in rotation when proceeding through the work stations in a manner fully disclosed in the above mentioned Patent #2,138,522. These work spindles may be stopped in any predetermined circumferential position relative to the headstocks 18 and 19 by appropriately jogging them to position by suitable means also set forth in the above mentioned patent to facilitate the easy loading and unloading of the work into the machine spindles when at the loading station.

Center drive steady rests

Also mounted on the indexing drum 7, are the center drive steady rests 41, best seen in Figure V, which have ring gears 42 adapted to be driven by pinions 43 which are of the same size and number of teeth as the pinions 24 for driving the work spindles 20 so that these center drive steady rests 41 will rotate in exact synchronism with the work spindles 20 in the headstocks 18 and 19.

Pot chuck indexing mechanism

On each of the work spindles 20, as best seen in Figures VI and VII, is provided an indexing pot chuck 44, which is journaled on its periphery 45 in the bearing 46, formed in the spindle 20 concentric with the offset axis 58 and is guided against axial movement longitudinally of the spindle by contact with the surface 47 of the work spindle and the surface 48 on the ring 49 fixed to the work spindle by suitable screws 50, so that it may be nicely rotated accurately on the work spindle in the bearing 46. The pot chuck 44 is provided with a half bushing 51 fixed to it by a suitable screw 52. It is also provided with a clamping cap 53, having a similar mating half bushing 54, fixed thereto by a screw 55, which may be drawn down toward the half bushing 51 by suitable clamping bolt 56a. This arrangement is provided to grip a premachined line bearing 56 of the stub end and line bearing 57 at the flange end of the crankshaft C as best shown in Figures IX, X, and XI. These bearings may thus be tightly gripped between said half bushings 51 and 54, accurately positioning the main axis of rotation 58 of the line bearings of the crankshaft C in a predetermined radially offset position from the axis of rotation 59 of the work spindle 20. This offset relationship between the axis 58 and 59 is precisely the throw or the radius of the circle that the axes of the crank pins follow as they move around the line bearing axis 58 of the crankshaft C. Also on this pot chuck 44 are provided the indexing and locating abutment blocks 60, as best seen in Figure IV, which are arranged to nicely engage each side of the end webs 61 and 62 of the crankshaft C by means of suitable locating areas 63, so as to positively and accurately position the crankshaft C in a predetermined indexed relationship on the pot chuck 44, and so that the crankshaft when gripped in said chucks cannot rotate on their respective line bearings 56, and 57 in the half bushing clamping devices.

Each of the pot chucks 44 is arranged to be rotated in the bearing 46 in the work spindles 20 to definite indexed positions as required by the various indexed positions of the crank pins of the crankshaft C. In this particular instance, noting Figure VII, the indexed positions required of the pot chucks 44 would be three in number; positions for the respective pairs of pins, numbers one and six, numbers two and five, and numbers three and four, as noted best in Figures IX, X, and XI. To effect this accurate indexing of the pot chucks 44 on the work spindles 20 to bring the respective pairs of pins above mentioned on to the axis of rotation 59 of the work spindles at the appropriate time at the various work stations, each of the pot chucks is provided with indexing pinions 64, Figure VI, suitably keyed to the pot chuck body 44 at 65, the axis of this pinion 64 coinciding precisely with the axis 58 of the pot chuck 44. Journaled in a suitable antifriction bearing 66 carried in the work spindle 20, is the indexing driving pinion 67, having its axis of rotation precisely coinciding with the main axis 59 of the work spindles 20 and in appropriate mesh with the pinion 64, so that when it is rotated, the pinion 64 and likewise the pot chuck 44 will be rotated in its bearing 46 about the axis 58. The pinion 67 projects into the bore 68 formed centrally of the work spindles 20 and has a splined portion 69 about which is nicely fitted the splined socket portion 70 of the actuating screw 71, so as to provide a rotary driving connection which also permits axial sliding of the screw 71, while rotating the gear 67. This screw 71 is carried in a suitable steep thread nut 72, fixed in the work spindles 20, so that as the screw 71 is moved parallel with the axis 59, it will affect rotation of the gear 67 and therefore the pot chuck 44. This axial movement of this screw 71 is done by means of the annular flanged end portion 73 formed on the outer end of this screw where it projects rearwardly from the work spindles 20 and cover plates 18a and 19a of the headstocks 18 and 19 respectively upon which is mounted a swinging yoke 74 mounted on the pin 74a in the bracket 18b having appropriate pins 75 and 76 which engage the flanged end portion 73, the pin 76 extending radially inwardly toward the axis of rotation 93 of the drum 7, operating in the indexing motion cam slots 77 of the ring cams 90 and 91, shown diagrammatically in Figure XII, so that as the yoke is swung back and forth parallel with the axis 59 of the work spindles 20, the screw 71 will be moved in the same direction and will also be caused to rotate a definite and accurate amount to effect rotation of the gears 67 and 64 to effect indexing of the pot chuck 44. Also in conjunction with this screw 71 is provided an indexing plunger 78 mounted in suitable bores 79 and 80 formed in the gears 67 and screw 71 respectively and coincident with the axis 59 of the spindles 20. This indexing plunger 78 is adapted to be moved axially in these bores by a yoke 81 carried on a pin 82 in the bracket 18b carried integral with the cover plate 18a and 19a of the headstocks 18 and 19 and has appropriate pins 83 and 84, which engage the flange ends 85 formed in the end of the indexing plunger 78, so that as this yoke 81 is swung by means of the pin 84 operating in the indexing plunger cam slot 86 of the ring cams 90 and 91 best shown in Figure XII, the plunger 78 may be moved so as to engage or disengage its tapered end 78a in the respective indexing holes 87, 88, and 89, with the pot chucks 44 best shown in Figure VII. These indexing holes 87, 88, and 89 provided in the pot chucks 44 are arranged so that they correspond in exact position with the various pairs of crank pins which are to be indexed to the main axis of rotation 59 of the work spindles 20. For instance, referring particularly to Figures VII, IX, X and XI, it will be noted that the indexing hole 87 is arranged in exact alignment with the pins numbers one and six, the indexing hole 88 with the crank pins numbers two and five, and the indexing hole 89 is arranged in exact position with that of the crank pin two and five.

*Operation of pot chuck indexing mechanism*

The operation of indexing these pot chucks 44 and of actuating the positive locking and indexing plunger 78 for the pot chucks is effected automatically by the indexing motion of the drum or work carrier 7 as it proceeds through the cycle of operation to the various work stations and the loading station. This is accomplished by means of the peripherial ring cams 90 and 91 each respectively mounted on the upright supports 2 and 3 by suitable bolts 92 in such a way that their peripheral surfaces 90a and 90b are concentric with the main axis of indexing 93 of the drum carrier 7, so that as the drum indexes the pot chucks are indexed on the various work spindles of the headstocks 18 and 19. The respective actuating pins 76 and 84 of the pot chuck rotating and pot chuck indexing plunger mechanism is operated in a predetermined sequential relationship by the arrangement of the cam slots 77 and 86, the peripherial diagrammatic development of which cam slots is clearly shown in Figure XII. These slots 77 and 86 are arranged to provide the following sequential operation of the indexing of the pot chucks 44 on the work spindles 20 and the actuation of the indexing plunger 78 as effected by the indexing of the drum 7, as follows:

The work is loaded in the pot chucks 44 by clamping it in the half bushings 51 and 54 and properly positioning the webs 61 and 62, by means of the locating areas 63. The chucks at this time are positioned as shown in Figures I and VI with the numbers one and six crank pins presented on the axis 59 of the work spindles 20 at which time the indexing plunger 78 is engaged in the indexing hole 87 and the indexing screw 71 is moved fully toward the chuck 44. The drum 7 is then indexed by the indexing motor 8 to present the work spindle to work station one while maintaining the screw 71 and indexing plunger 78 in the position just described, by keeping the portions 77a and 86a of the cam slots 77 and 86 parallel with each other during the indexing from the loading station to work station one, as clearly shown in Figure XII. After the completion of the machining of the crank pins numbers one and six, Figure IX, the drum is again indexed by the indexing motor 8 and operation of the indexing plunger 15 as fully described in the Patent #2,138,552 above referred to, at which time the indexing plunger 78 is immediately withdrawn by means of the slot 86b while the slot 77b continues parallel with the slot 77a so that no rotation of the pot chucks 44 takes place until the indexing plunger 78 has been fully withdrawn. As the indexing of the drum 7 has moved to the point 94, the indexing plunger 78 has been fully withdrawn and the portion 77c of slot 77 comes into play to cause the screw 71 to be moved partially away from the chuck 44 causing it to rotate and thereby rotate the gears 67 and 64 and effecting rotation of the pot chucks 44 to bring the indexing hole 89 (Figure VII) into alignment with the indexing plunger 78 and likewise bringing the crank pins numbers two and five into position on the axis 59 of the work spindles at the point 95. Meanwhile, during the travel along the slot 77c the slot 86c remains parallel holding out the indexing plunger 78. When the point 95 is reached the indexing plunger is again allowed to enter the new indexing hole 89 by the slot portion 86d while the portion 77d holds the pot chuck 44 substantially in accurate indexed position on the work spindle 20.

After the completion of the machining operations on the crank pins numbers two and five at work station two, again the indexing drum 7 is actuated by the indexing motor 8 at which time the portion 86e of the cams 90 and 91 withdraws the indexing plunger 78 while the screw 71 is held against movement by the portion 77e of these cams until the point 96 is reached at which time the indexing plunger 78 is held out of engagement with the pot chuck 44 by the parallel portion 86f while the portion 77f of the cams rotates the pot chuck 44 by still further moving the screw 71 outwardly, thus bringing the indexing hole 88 (Figure VII) into alignment with the indexing plunger 78 and likewise bringing the crank pins numbers three and four on the axis of rotation 59 of the work spindles 20. This point is reached at 97, at which time the screw 71 is held in extreme out position with the pot chuck 44 substantially accurately indexed to position for the crank pin three and four at which point the index plunger 78 is again allowed to enter the new indexing hole 88 by the portion 86g of the cam slot 86 while the portion 77g holds the screw 71 inoperative.

After the completion of the turning of crank pins three and four at work station three, the indexing plunger 78 is again withdrawn by the portion 86h of the cams 90 and 91 when the point 98 is reached. The portion 77i effects the movement of the screw 71 in the reverse direction completely back to the original position toward the chuck 44, so as to rotate the pot chuck back to the position at the time it started at the loading station with the indexing hole 87 in position to be engaged by the indexing plunger 78, the indexing plunger 78 having been held out in inoperative position to the position 99 by the parallel portion 86i of the cam 90. When the point 99 is reached the pot chucks 44 have thus been brought back to the original position with pins numbers one and six again positioned on the work spindle axis 59 and the indexing plunger 78 again allowed to enter into the indexing hole 87 by the cam portion 86j while the portion 77j holds the pot chucks substantially indexed in their original position. The work is then unloaded from the chucks and a new piece of work replaced therein and the cycle repeated, as described.

Thus in this particular arrangement the crankshaft, when first placed in the work spindle at the loading station, is kept in indexed position with its pins numbers one and six in position and is indexed to work station one where these pins are machined as shown best in Figure IX. It is then indexed to work station two by the drum 7, at which time the pot chucks 44 are also indexed 120° to bring crank pins numbers two and five into position on the work spindle axis 59 for operation of the cutting tools on these pins, and then as the drum 7 is further indexed to bring the work to the work station three, again the pot chucks are indexed an additional 120° to bring the crank pins three and four into operative position on the axis 59 of the work spindles 20 for machining of these pin bearings. After the completion of the machining of these pin bearings at work station three, the pot chucks are then indexed in the reverse direction 240° to bring the chucks back in proper relation again for the beginning of the next cycle, at which time the work is replaced and a new piece put into the chuck at the loading station for again continuing the cycle of operation.

*Tool feeding mechanism*

It will be noted with particular reference to Figures IV, V, IX, X, and XI, that the cutting tool feeding devices have no orbital motion at the various work stations, but have a plain feeding motion being carried on the frame of the machine, there being a pair of tools for each pair of respective pins to be turned at each work station, as best illustrated in Figures IX, X, and XI. At work station one are provided the tool slides 100 and 101, which carry suitable tool holders 102 and 103, each having cutting tools 104 for machining the numbers one and six pins of the crankshaft simultaneously. These tool slides 100 and 101 are carried on suitable dove tail guideways 105 formed in the frame member 4 which is carried on top of the upright supports 2 and 3 as described. Likewise at work station two are provided the tool slides 106 and 107 each having tool holders 108 and 109 (Figure X) respectively, carrying the cutting tools 110 for machining these crank pins. These tool slides are carried on suitable dove tail guideways 111 on the housing 112 fixed to the base portion 1a of the base 1 of the machine.

At work station three are mounted the tool slides 113 and 114, having tool holders 115 and 116 respectively, carrying cutting tools 117 for machining the crank pin numbers three and four as best shown in Figure XI. All of these tool slides 100, 101, 106, 107, 113, and 114 are actuated simultaneously to and from the axis of indexing 93 of the drum 7 and radially of the axis of rotation 59 of the work spindles 20 by means of the pinions 118 on the feed shaft 119, pinions 120 on the feed shaft 121, and pinions 122 on the feed shaft 123 and the idler pinions 124. These pinions engage the respective racks 125, 126, and 127 on the respective tool slides as best shown in Figures IV and V. All of these feed shafts 119, 121, and 123 are provided with pinions 128, best shown in Figure III, which are simultaneously engaged by the large segmental feed gear 129, suitably journaled on the drum 7 about the axis of rotation 93 of said drum. This segmental gear 129 is actuated by a suitable rack 130 connected to a hydraulic feed cylinder 131 which may be appropriately actuated in feeding movement to cause all of the tools 104, 110 and 117 to feed simultaneously on the various crank pins at the various work stations during the cutting cycle of the machine. Thus all of the cutting tools at all of the work stations are fed simultaneously, the cutting tools at work station one machining pins numbers one and six simultaneously, the cutting tools at work station two machining pins two and five simultaneously, while the cutting tools at work station three machine crank pins three and four simultaneously, all operations at all of the work stations taking place at the same time.

*Supporting work intermediate the pot chucks*

In some instances where relatively long limber crankshafts of a multiplicity of bearings (such as shown in this illustration) are to be machined, it is desirable to have a support by the work somewhere intermediate its ends which are chucked in the indexing pot chucks. For this purpose, a center drive steady rest 41 may be utilized as pointed out. This steady rest or, if desired, a plurality of steady rests, may be used to support the crankshaft by means of premachined intermediate line bearings or may be utilized as shown in this illustration to support the crankshaft by means of a peripheral locating area machined on the crankshaft concentric with its main axis of line bearing rotation, in a manner, for example, as set forth in Patent #2,141,466, issued December 27, 1938, in which is illustrated this type of peripheral locating area prepared on a crankshaft web. Noting particularly Figure V, in each of the center drive ring gear steady rests 41, driven by the gears 42 from the gears 43 fixed on the drive shaft 25, is provided a half bushing 132, which is fixed in the segmental portion 133 of the center drive ring gear steady rest 41, and is adapted to receive the crankshaft by means of the peripheral locating areas 134 formed on the web of the crankshaft, in the manner of a journal bearing. Above these half bushings 132 are provided clamps 135, which may be brought down over the half bushings 132, they in themselves having a half bushing 136, and drawn up tightly against the surfaces 137 in the segmental portion 133, by a suitable clamping bolt 138, so that the half bushings 132 and 136 form a rigid bearing when clamped by the bolts 138 in which the crankshaft is snugly journaled but free to rotate on its peripheral locating areas 134 provided on its center web 134a. By means of this arrangement the center drive steady rest bearing, formed by the half bushings 132 and 136, has its axis of rotation precisely coinciding with that of the axis 58 of the indexing pot chucks 44 which is the axis of the line bearings of the crankshaft when chucked in the lathe. It can thus be seen that with this arrangement the half bushings form bearings which are off-set from the true axis of rotation 59 of the work spindles 20, and in precisely the same way that the half bushings 51 and 54 are located with respect to the axis 58 in the pot chucks 44, and since the crankshaft web is journaled in these half bushings, the crankshaft may be rotated therein to take care of the indexing movement which is imparted to the crankshaft at the various work stations by the indexing of the pot chucks as described. The center drive ring gears 41 are also rotated in synchronism with the pot chucks as described so that the relationship of the bushings 132 and 136 in the center drive steady rests are at all times maintained in proper synchronous rotation with the bushings 51 and 54 in the pot chucks 44. Also, owing to the fact that these bushings in these center drive steady rests are offset from the true axis of rotation 59 of the lathe they act as a work driver under all conditions to assist in rotating the crankshaft, driven by the pot chucks 44 from each end, at a point intermediate these ends to add greater stability and rigidity to the work during the turning operations on the various crank pins. We, therefore, have a means for chucking the crankshaft, for rotating it at each end and also for driving it intermediate its ends and an arrangement in which the various chucking devices and center drive steady rests cooperate to provide means for automatically indexing the crankshaft in the pot chucks to various indexed positions for presenting the different sets of crank pins on the true axis of rotation of the work spindle for operations upon these respective pins by the cutting tools at the various work stations.

Having thus fully set forth and described my invention what I claim as new and desire to secure by United States Letters Patent is:

1. In a lathe, a movable carrier, work spindles mounted on said work carrier, comprising a pair of headstocks containing rotatable work spindles and a rotatable center drive steady rest located on said carrier intermediate said headstocks, work holding devices on said spindles in said headstocks, means for indexing said work holding devices on said spindles by the movement of said carrier, and means in said center drive steady rest, cooperating with said work holding devices on said work spindles, to maintain indexed relationship with said work holders when they are indexed to various indexed positions.

2. In a lathe, an indexing carrier, a series of work spindles, mounted on said carrier, comprising a pair of headstocks axially spaced on said carrier and center drive steady rest means located intermediate said headstocks.

3. In a lathe, a rotatable carrier member, a series of work spindles, on said carrier member, each comprising a pair of axially spaced headstocks and center drive steady rest means rotatable in synchronism with said spindle located on said carrier intermediate said headstocks, and means for driving said headstocks and said center drive steady rests in synchronism.

4. In a lathe, a frame, an indexing work carrying drum journaled in said frame, a series of work spindles on said drum each comprising a pair of axially spaced headstocks and center drive steady rest means located intermediate said headstocks, means for indexing said drum to a series of work stations to present said work spindles to a series of work stations, means for rotating said headstocks and center drive steady rest means for each work spindle in synchronism, cutting tool feeding devices located at said work stations, work holding mechanism on said work spindles and in said center drive steady rest means, and means for indexing said work holding devices to predetermined positions when said work spindles are presented, by said indexing mechanism for said drum member, successively to each of said work stations.

5. In a lathe, a rotatable work carrier, a series of work spindles on said work carrier, means for indexing said work carrier so as to successively present said work spindles to a series of work stations, tool feeding devices located at said work stations, means for simultaneously feeding all of said tool feeding devices relative to said work spindles of said work carrier, work holding devices on the work spindles, and means for indexing said work holding devices on said work spindles as they are successively presented to said work stations.

6. In a crankshaft lathe, a movable work carrier, a series of work spindles mounted on said carrier, each of said work spindles comprising pot chuck devices eccentrically mounted on said spindles having means for chucking and supporting a crankshaft in a predetermined indexed position on said chuck, a series of work stations, cutting tools mounted at said work stations, means for moving said carrier to successively present said work spindles to said work stations, and means for indexing said pot chucks on said work spindles during the movement of said work carrier in presenting said work spindles to said work stations.

7. In a crankshaft lathe, a movable work carrier, a spindle mounted on said work carrier having pot chuck devices mounted thereon for supporting and rotating a crankshaft in predetermined indexed position relative to said pot chuck, and means for indexing said pot chuck on said spindle by the movement of said carrier.

8. In a crankshaft lathe, a movable work carrier, a series of work spindles mounted on said work carrier, means for moving said work carrier so as to successively present said work spindles to a series of work stations associated therewith, chucking mechanism on said work spindles adapted to chuck a crankshaft with its line bearing axis offset from the axis of rotation of said work spindles and with its crank pins lying in a circle passing through the axis of rotation of said work spindles, said chucking mechanism being adapted to grip said crankshaft in a predetermined indexed position relative to said chucking device, cutting tools at said work stations adapted to machine different crank pins of said crankshaft at each work station, and means for indexing said chucking devices on said work spindles so as to present different sets of crank pins to working position at each of said work stations when said carrier member is moved to present said work spindles successively to said work stations.

9. In a crankshaft lathe adapted to machining the crank pins of a crankshaft comprising, a movable work carrier, a series of work spindles on said work carrier, means for moving said carrier so as to successively present said work spindles to a series of work stations, chucking devices on said work spindles adapted to support and rotate a crankshaft with its line bearing axis offset from the axis of rotation of said work spindles, and means for indexing said chucking devices on said work spindles so as to successively present different crank pins of said crankshaft on the axis of rotation of said work spindles as said work carrier successively presents said work spindles to said work stations.

10. In a crankshaft lathe, a movable work carrier, a series of work spindles on said work carrier, adapted to be successively presented to a series of work stations, comprising a pair of rotatable work spindles, chucking devices on said work spindles for chucking a crankshaft with its line bearing axis offset from the axis of rotation of the work spindle, a center drive steady rest intermediate said work spindles adapted to engage a locating surface on said crankshaft intermediate said chucking devices on said work spindles, and means for indexing said crankshaft in said chucking devices and said center drive steady rest so as to successively present different sets of crank pins on the axis of rotation of said work spindles.

11. In a crankshaft lathe, a movable carrier member, a series of work spindles on said carrier member, and means for moving said carrier member so as to successively present said work spindles to a series of work stations associated with said carrier, each of said work spindles comprising pot chuck devices adapted to grip a crankshaft by means of its premachined end line bearings and to engage the terminal webs of said crankshaft by means of locating abutments so as to definitely index said crankshaft in said pot chucks, and means for rotating said pot chucks so as to index said crankshaft to bring different crank pins on the axis of rotation of said work spindles.

12. In a crankshaft lathe, a movable carrier member, a series of work spindles on said carrier member, and means for moving said carrier member so as to successively present said work spindles to a series of work stations associated with said carrier, each of said work spindles comprising pot chuck devices adapted to grip a crankshaft by means of its premachined end line bearings and to engage the terminal webs of said crankshaft by means of locating abutments so as to definitely index said crankshafts in said pot chucks, and means for rotating said pot chucks so as to index said crankshaft to bring different crank pins on the axis of rotation of said work spindles, a center drive steady rest mounted on said carrier associated with said work spindles and rotated in synchronism therewith, locating surfaces in said center drive steady rest adapted to engage surfaces on sand crankshaft so that said crankshaft may be indexed by said pot chucks while at all times supported in said center drive steady rest.

13. In a crankshaft lathe, a movable work carrier, a series of work spindles mounted on said work carrier comprising a pair of headstocks axially spaced on said carrier, work spindles journaled in said headstocks, pot chuck devices eccentrically rotatably mounted on said work spindles, means in said pot chuck devices for gripping a crankshaft in a specific oriented indexed position on said pot chuck, and means for indexing said pot chuck on said work spindles.

14. In a crankshaft lathe, a movable work carrier, a series of work spindles mounted on said work carrier comprising a pair of headstocks axially spaced on said carrier, work spindles journaled in said headstocks, pot chuck devices eccentrically rotatably mounted on said work spindles, means in said pot chuck devices for gripping a crankshaft in a specific oriented indexed position on said pot chuck devices, and means for indexing said pot chuck on said work spindles by the movement of said carrier so as to successively present different pins of said crankshaft on the axis of rotation of said work spindles.

15. In a crankshaft lathe, a movable work carrier, a series of work spindles, mounted on said work carrier, adapted to be presented to a series of work stations by the movement of said carrier, each of said work spindles comprising pot chuck mechanism eccentrically rotatably mounted on said work spindles, means for chucking a crankshaft in a predetermined indexed position in said pot chucks, center drive steady rest devices mounted intermediate said pot chucks and having half bushing means for engaging a peripheral locating area on a web of said crankshaft, said locating bushing being offset from the true axis of rotation of said work spindles, means for indexing said pot chucks on said work spindles, and means in said steady rest devices permitting rotation of said crankshaft on said peripherial locating area in said half bushing devices during the indexing of said pot chuck devices on said work spindles.

16. In a crankshaft lathe for machining the pin bearings of a multi-throw internal combustion engine crankshaft, a frame, a rotatable work carrier mounted on said frame, a series of work spindles mounted on said work carrier, a series of work stations on the frame of said lathe at which are located different sets of tool feeding devices for operating on different crank pins of said crankshafts, means for moving said work carrier so as to successively present said work spindles to said work stations at which different crank pins are operated upon at each work station to complete all of the crank pins of said crankshaft after said crankshafts have been successively presented to all of said work stations.

17. A method of machining the crank pins of a multi-throw internal combustion engine crankshaft comprising the step of; (a) chucking and rotating said crankshaft; (b) of moving said crankshaft, while chucked, and rotated to different sets of cutting tools, each set adapted to machine a different crank pin of said crankshaft, and the step (c) of successively presenting said crankshaft to all of said cutting tools to finally complete the machining of all of said crank pins.

18. In a crankshaft lathe, adapted to machining the crank pin bearings of a multi-throw internal combustion engine crankshaft, a movable work carrier, a series of work spindles mounted on said work carrier, means for moving said work carrier so as to successively present said work spindles to a series of work stations, pot chucks mounted eccentrically and rotatably on said work spindles having mechanism for engaging and gripping premachined end line bearings of a crankshaft and to index said crankshaft by engagement with its terminal webs adjacent said end line bearings, center drive steady rest device, located intermediate the pot chucks on said work spindles, having half bushings forming a journal bearing for a peripherial locating area premachined on an intermediate web of said crankshaft, means for indexing said pot chucks on said work spindles during the movement of said work carrier so as to rotate said crankshaft to bring various different crank pins on the axis of rotation of said work spindles and center drive steady rest device, tool feeding devices at said work stations, the tools at each of said work stations adapted to engage different crank pins from those at the other of said work stations, and means for simultaneously feeding all of said tool feeding devices to crankshafts at said work stations.

19. In a lathe, a movable carrier, a series of work spindles on said carrier rotatable relative to said carrier, indexible work holders mounted on said spindles, means for moving said carrier to successively present said work spindles to a series of work stations of said lathe, and means for indexing said work holders relative to said work spindles.

20. In a lathe, a movable carrier, a series of rotatable work spindles mounted on said carrier, indexible work holders mounted on said work spindles, means for moving said carrier to successively present said work spindles to a series of work stations of said lathe, and means for indexing said work holders on said work spindles as said work spindles are presented to said work stations.

21. In a lathe, an indexible carrier, a series of work spindles mounted on said carrier, a series of work stations associated with said carrier, means for indexing said carrier so as to successively present said work spindles to said work stations, indexible work holders mounted on each of said work spindles, and means for indexing said work holders on said work spindles by the movement of said work carrier in presenting said work spindles successively to said work stations.

22. In a lathe, a movable carrier, a series of rotatable work spindles mounted on said carrier, indexible work holders mounted on said spindles, and means for indexing said work holders on said work spindles by the movement of said carrier.

23. In a lathe, an indexible work spindle carrier, means for indexing said carrier to a series of predetermined positions, a series of rotatable work spindles mounted on said carrier, a series of indexible work holders mounted on said spindles, and means for indexing said work holders on said work spindles to a series of indexed positions in a sequential relationship to the indexed positions of said work spindle carrier.

24. In a lathe, a frame, an indexible work spindle carrier in said frame, means on said frame for indexing said carrier to a series of indexed positions, a series of work stations at said indexed positions having cutting tools mounted on said frame for movement to and from said carrier, means for feeding said cutting tools, a series of rotatable work spindles mounted on said carrier arranged to be presented to said work stations by the indexing of said work spindle carrier, means for rotating said work spindles at cutting speed on said work spindle carrier, indexible work holders on each of said work spindles, and means for indexing said work holders to predetermined relative positions on said work spindles for each indexed position of said work spindle carrier in presenting said work spindles to said work stations.

WILLARD L. GROENE.